United States Patent [19]

McLaughlin et al.

[11] Patent Number: 5,252,625

[45] Date of Patent: Oct. 12, 1993

[54] METHOD FOR PRODUCING RIGID FOAMS AND PRODUCTS PRODUCED THEREFROM

[75] Inventors: Andy I. McLaughlin; Richard L. Donald; Robert H. Blanpied; Robert J. Butkus, all of Meridian, Miss.

[73] Assignee: Atlas Roofing Corporation, Meridian, Miss.

[21] Appl. No.: 720,735

[22] Filed: Jun. 25, 1991

Related U.S. Application Data

[63] Continuation-in-part of Ser. No. 495,616, Mar. 19, 1990, abandoned.

[51] Int. Cl.$^5$ .................. C08G 18/18; C08G 18/22; C08J 9/08
[52] U.S. Cl. .................. 521/125; 521/129; 521/131; 521/137; 521/155; 521/163; 521/172; 521/174
[58] Field of Search .............. 521/131, 129, 137, 155, 521/163, 172, 174, 125

[56] References Cited

U.S. PATENT DOCUMENTS

| | | | |
|---|---|---|---|
| 4,485,196 | 11/1984 | Speranza et al. | 521/172 |
| 4,572,865 | 2/1986 | Gluck et al. | 428/309.9 |
| 4,636,529 | 1/1987 | Crooker | 521/131 |
| 4,710,521 | 12/1987 | Soukup et al. | 521/118 |
| 4,714,717 | 12/1987 | Londrigan et al. | 521/131 |
| 4,898,893 | 2/1990 | Ashida | 521/131 |
| 4,927,863 | 5/1990 | Bartlett et al. | 521/131 |
| 4,960,804 | 10/1990 | Doerge | 521/130 |
| 4,981,879 | 1/1991 | Snider | 521/131 |
| 4,981,880 | 1/1991 | Lehmann et al. | 521/125 |
| 5,032,623 | 7/1991 | Keske et al. | 521/131 |
| 5,091,436 | 2/1992 | Frisch et al. | 521/137 |

OTHER PUBLICATIONS

N. Malwitz, P. A. Manis, S.-W. Wong and K. C. Frisch, "Amine Catalysis of Polyurethane Foams" 30th Annual Polyurethane Conference, Oct. 15-17, 1986, pp. 338-353.

Primary Examiner—John Kight, III
Assistant Examiner—John M. Cooney, Jr.
Attorney, Agent, or Firm—Nixon & Vanderhye

[57] ABSTRACT

In a method of producing a thermosetting foam, a first of two foam forming blends ("A Blend") is prepared using polymeric polymethylene polyphenylisocyanate ("PMDI"). A second of two foam forming blends ("B Blend") is prepared by mixing together a polyol; water; a tertiary amine catalyst having at least one ethyl ($-CH_2-CH_2-$) linkage between two heteroatoms, the heteroatoms being chosen from the group consisting of Nitrogen and Oxygen; and, an alkali metal organo-salt catalyst. A first blowing agent is included with one of the two foam forming blends. When the first and second foam forming blends are mixed together, the tertiary amine catalyst quickly initiates a reaction predominately of the polymeric polymethylene polyphenylisocyanate with water (as opposed to a reaction with the polyol). The quick reaction of the PMDI with water causes, prior to a gel point of the foam, both (1) the production of a second blowing agent for forming cells in the blends and for causing expansion in the liquid blends; and (2) sufficient exothermic heat to initiate boiling of the first blowing agent. Relatively large amounts of alkali metal organo-salt catalyst induce rapid vaporizing of the first blowing agent due to a high level of exothermic heat, whereby expansion of the mixed blends is substantially completed prior to the effective conversion of the mixed liquid blends to a solid. According to the method, a degree of completion of expansion of the foam at any point in time exceeds a degree of completion of chemical reactions of the foam. In another mode of the invention, a frothing agent is also employed.

47 Claims, 3 Drawing Sheets

METHOD FOR PRODUCING RIGID FOAMS AND PRODUCTS PRODUCED THEREFROM

This application is a continuation-in-part of U.S. patent application Ser. No. 07/495,616 filed Mar. 19, 1990, now abandoned.

BACKGROUND

1. Field of Invention

This invention pertains to methods of producing rigid foams and the foams made thereby, particularly polyurethane modified polyisocyanurate foams used for structural laminated board insulation.

2. Prior Art and Other Considerations

Cellular organic plastic foams made with urethane linkages, or made with a combination of both isocyanurate linkages and urethane linkages, are well known in the art. These foams have been made from the catalyzed reaction between polymeric polymethylene polyphenylisocyanate (a.k.a. Polymeric Methylene Di-Isocyanate, or "PMDI") and polyols of various physical and chemical properties. The PMDI has been used either alone, or in a blend with a blowing agent and (optionally) with a capped silicone surfactant. Such a blend utilizing PMDI has traditionally been called the "A-Blend".

In order to form good cell size, good cell distribution, and good cell-wall construction, it has sometimes been preferred to add other "plastic foam cell modifiers" to the foam formulations. Often, it has been preferred to add these other agents to the polyol mixture. These foam cell modifiers include, but are not limited to: propylene carbonate, dispersing agents, organic surfactants, predominantly silicone surfactants, nucleating agents, fire retardants, and expansion agents. This blend including the polyol(s), expansion agent(s), and catalyst(s), has traditionally been called the "B-Blend".

As used herein, the term "expansion agents" includes blowing agents and frothing agents. Moreover, as used herein, a blowing agent is a substance which is either produced, or becomes a gas, subsequent to the first of several chemical reactions. Many blowing agents have boiling points in the range from about 10° C. to about 50° C. On the other hand, $CO_2$ is considered a blowing agent since, although it has a boiling point outside this range, it is produced by an isocyanate reaction. A frothing agent is a substance which is a liquid under sufficient pressure, then when released from pressure containment, accordingly produces gas-filled cells in foam prior to the initial chemical reaction.

It has been considered important to keep the viscosity of each mixed blend about equal to the other blend. The rule of thumb has been to keep both the A-Blend and the B-Blend in the range of 250 cps to 1500 cps, and to run the chemical blends at about 60° F. to about 70° F. just prior to mixing. (All viscosities herein are "centipoise" taken on a Brookfield viscometer.)

Prior art insulation thermosetting foams have been primarily "blown" or expanded by the use of CFC-11 (trichloromonofluoromethane). Some minor use of CFC-12 has also been used, as explained below. Due to environmental considerations, both CFC-11 and CFC-12 have fallen into disfavor. Most commercial foam producers have historically formulated all of their foam formulae around CFC-11 properties. These properties of CFC-11 affecting the foam formulae include the boiling point, the solubility parameters, the number of molecules per unit weight, the latent heat at boiling point, and the rate of membrane permeability, of CFC-11. The commercial foam laminate producer has learned to operate the continuous laminating foam board process based upon these known physical properties.

There are two general phenomena which must take place in concert with each other in order to make quality structural foam laminates at a reasonable price. These two phenomena are (1) the expansion of the foam and (2) the foam chemical (polymerization and cross-linking) reactions. The expansion of the foam is measured volumetrically; the chemical reactions are measured in terms of solidification. As used herein, the "degree of completion of expansion" means the degree of completion (with reference to the ultimate potential expansion) of the foam expansion at any point in time. The "degree of completion of the chemical reactions", or comparable phraseology, means the degree of completion (with reference to the ultimate potential degree of polymerization and cross-linking) of the foam chemical reactions at any given point in time.

It is critical that the chemical reactions have enough energy input to proceed to a substantially completed stage. This is especially crucial to foam board laminators who must depend upon a high degree of the trimerization reaction of three PMDI molecules to form the isocyanurate linkage. The most popular plastic foam insulation used for building construction is polyurethane modified polyisocyanurate foam. The only economical way this foam insulation can meet the stringent fire resistance requirements of building codes is to form high levels of isocyanurate group cross-linking.

Likewise, it is important for the successful production of foam board lamination to have the degree of completion of the many complex chemical reactions of the thermosetting polymerization timed with the degree of completion of foam expansion. Additionally, these reactions must be finished quickly enough to obtain the full thickness and to maintain the planned thickness of a laminated board once it leaves a continuous double-belt laminator; at the desired density.

When CFC-11 and CFC-12 are ultimately replaced by alternate blowing and/or frothing agents, the prior art techniques of creating energy input to effect the critical timing of expansion versus reactions will not suffice. Some new frothing and blowing agents have detrimental properties that interfere with exothermic heat energy. Moreover, these new agents demand more energy to function as expansion agents. Alternative blowing agents of this type include hydrochlorofluorocarbons, or partially hydrogenated chlorofluorocarbons, (referenced by the contraction "HCFCs"); as well as the non-chlorine containing fluorocarbons, called hydrofluorocarbons, or just "HFCs". All the physical properties mentioned above (including the boiling point, the solubility parameters, the number of molecules per unit weight, the latent heat at boiling point, and the rate of membrane permeability) differ for HCFCs and HFCs as opposed to CFC-11 and CFC-12. As will be shown, these physical properties are detrimental to both heat energy utilization and the timing of the reactions with the degree of completion of expansion.

For example, both HCFC-123 and HCFC-141b have higher boiling points than CFC-11. The CFC-11 boils at 74.9° F. (23.8° C.); while HCFC-123 boils at 82.2° F. (27.9° C.), and HCFC-141b boils at 89.6° F. (32.0° C.).

The higher boiling point means the start of the expansion of foam requires more heat energy input than prior art methods. Using prior art methods, these two new HCFCs naturally slow down foam expansion. Slow expansion of the foam allows the chemical reactions to create solidification prior to cell expansion, which causes a high foam density, i.e., low insulating properties.

Another detrimental effect of some new expansion agents is the cooling effect caused by the partial evaporation of low boiling point products. For example, monochlorodifluoromethane, $CHClF_2$, or HCFC-22, boils at $-41.4°$ F.($-40.8°$ C.), meaning some of the product added will evaporate as soon as it is released to atmospheric pressure, and thus will cool the polymer mixture. Another new potential blowing agent in this category, $CH_3CClF_2$, or HCFC-142b (monochlorodifluoroethane), has a boiling point of $+14.4°$ F., or $-9.8°$ C.

It has been discovered that the cooling effect of an evaporating frothing agent reduces the exothermic heat generated by the urethane chemical reaction. To a large degree, the exothermic heat from the urethane reaction is the main heat energy source for the trimerization reaction. It is well known that high levels of heat energy are needed to complete the trimerization reaction which causes the PMDI to form into the isocyanurate linkage. A lack of trimerization causes product failures from the loss of dimensional stability and from excess flammability.

U.S. Pat. No. 4,572,865 teaches the production of polyisocyanurate foams using CFC-12, dichlorodifluoromethane, $CCl_2F_2$, which boils at $-21.6°$ F. ($-29.8°$ C.), as a frothing agent. While U.S. Pat. No. 4,572,865 does not specifically mention the cooling effect of using CFC-12, it is well known that this frothing agent does create evaporative cooling in rigid foam production. Other than possibly using high oven temperatures, U.S. Pat. No. 4,572,865 fails to teach any chemical reaction to make up the loss of exothermic heat energy which is taken away by the evaporative cooling of the frothing agent, CFC-12.

As mentioned above, CFC-12 has fallen into disfavor. The only practical HCFC to replace CFC-12 as a frothing agent is HCFC-22, $CHClF_2$, monochlorodifluoromethane. This compound boils at $-41.4°$ F.($-40.8°$ C.), meaning it boils more easily and cools much faster than does CFC-12. Without a way to compensate for the loss of exothermic heat due to the cooling effect of evaporating HCFC-22, the trimerization reaction would be extremely difficult to effect, if not impossible.

The strong solvent action characteristic of some of the new blowing agents is detrimental if used with methods of the prior art. To a large degree, these new agents are much stronger solvents in both B-Blends and A-Blends than were the CFC blowing agents of the prior art. The increased solubility causes dramatic decreases in blend viscosities. When the viscosity of the foamable blends gets too low, the resulting mixture of A-Blend (primarily PMDI) with B-Blend (primarily polyol) will form cells with thin walls and thick intercellular struts. This creates a foam which is poor insulation. Very small cell diameters (microcellular), with the cells having closed walls and thin struts, all at the proper density, are desired for good insulation properties. To create good cellular walls in the cellular foam matrix, the viscosity of the final foaming mixture must be high enough to restrain "drainage" from the cell wall into the cellular strut. Another need for higher viscosity polyols arises from the use of frothing agents. When a rapid frothing action occurs in a low viscosity liquid, the cell walls rupture creating an open celled foam. This is a common practice in producing flexible foam, as explained below.

Thus it is seen that prior art methods of continuous lamination processing must be significantly changed to utilize HCFCs in order to be commercially successful. New methods are needed to compensate for the detrimental effect upon exothermic heat generation, and to maintain the timing that is needed in commercial foam production to balance the speed of expansion with the speed of chemical reactions.

It is therefore an object of the present invention to provide an improved method for the production of a rigid thermosetting plastic foam insulation, which method provides an increased amount of exothermic heat.

An advantage of the present invention is the provision of a method which overcomes the negative effects of evaporative cooling from low boiling point frothing agents.

An advantage of the present invention is the provision of a method which not only overcomes the negative effects of evaporative cooling from low boiling point frothing agents, but also conveniently maintains the rate of expansion when utilizing higher boiling point blowing agents.

It is another advantage of the present invention to provide a method whereby a frothing agent having a lower boiling point than used in prior art foams, as well as blowing agents with higher boiling points, can be used together and still maintain the temperatures needed for the completion of the trimerization reaction as well as maintaining the timing of the speed of foam expansion with the speed of chemical reactions.

It is a further advantage of the present invention to provide an improved cell structure in rigid plastic foam insulation by utilizing smaller organic molecules in solution than previously used as a nucleating agent in the process.

Yet a further advantage of the present invention is the provision of a method that compensates for the rapid expansion of a frothing agent by maintaining strong cell walls and a high percentage of closed foam cells.

Yet another advantage of the present invention is the provision of a method that compensates for the strong solvent action of some new blowing agents and still maintains good cell wall formation.

It is still another advantage of the present invention to provide an improved structural laminated foam board insulation at a cost lower than would be possible by using HCFC blowing agents alone, by utilizing at least some $CO_2$ blowing agent.

A further advantage of the present invention is the provision of an improved structural laminated foam board insulation at a cost lower than would be possible by using blowing agents plus utilizing at least some $CO_2$ blowing agent, by additionally utilizing a frothing agent.

A further advantage of the present invention is the provision of a strong, economical, closed cell foam insulation which is characterized by a high degree of fire resistance and a high resistance to thermal conductivity.

SUMMARY

In a method of producing a thermosetting foam, a first of two foam forming blends ("A Blend") is prepared using polymeric polymethylene polyphenylisocyanate ("PMDI"). A second of two foam forming blends ("B Blend") is prepared by mixing together a polyol; water; a tertiary amine catalyst having at least one ethyl ($-CH_2-CH_2-$) linkage between two heteroatoms, the heteroatoms being chosen from the group consisting of Nitrogen and Oxygen; and, an alkali metal organo-salt catalyst. A first blowing agent is included with one of the two foam forming blends.

When the first and second foam forming blends are mixed together, the tertiary amine catalyst quickly initiates a reaction predominately of the polymeric polymethylene polyphenylisocyanate with water (as opposed to a reaction with the polyol). The quick reaction of the PMDI with water causes, prior to a gel point of the foam, both (1) the production of a second blowing agent for forming cells in the blends and for causing expansion in the liquid blends; and (2) sufficient exothermic heat to initiate boiling of the first blowing agent. Relatively large amounts of alkali metal organo-salt catalyst induce rapid vaporizing of the first blowing agent due to a high level of exothermic heat, whereby expansion of the mixed blends is substantially completed prior to the effective conversion of the mixed liquid blends to a solid.

The tertiary amine catalyst preferentially causes the water to react with isocyanate to produce $CO_2$, thereby causing a degree of completion of expansion of the foam at any point in time to exceed a degree of completion of chemical reactions of the foam. The tertiary amine catalyst is chosen from a group consisting of dimethylethanolamine, pentamethyldiethylenetriamine, and bis(2-dimethylaminoethyl)ether.

The organo-salt catalyst is chosen from a group consisting of potassium 2-ethylhexanoate and potassium acetate. The amount of organo-salt catalyst mixed in the blend is greater than about 0.9 weight percent of the total weight of the foam.

In one mode of the invention, a frothing agent is included in one of the foam forming blends. The high level of exothermic heat obtained by the present invention is sufficient to substantially complete all potential chemical reactions in spite of any cooling caused by any evaporation of the frothing agent.

Thus, a higher exothermic temperature producing reaction is utilized than was used in prior art rigid foam production. The higher energy is utilized by the higher temperature requirements of higher boiling point HCFCs, and optionally, the increased heat energy is absorbed by evaporative cooling.

The utilization of the higher heat energy avoids the scorching problems usually associated with excessive exotherm temperatures, but advantageously assures that the foam properties are not harmed by a lack of energy needed to complete reactions. This heat energy is utilized to assure the completion of the critical trimerization reaction, which in turn assures the flammability resistance and dimensional stability of the rigid polyurethane modified polyisocyanurate foam insulation.

Additionally, the increased heat energy is used to advantage by the higher boiling point blowing agents utilized in the instant invention. These higher boiling points require more heat energy to cause expansion of the rigid foam.

Also, certain B-Blend polyols are advantageously used to compensate for the higher solvent action of a new class of blowing agents described herein; as well as the rapid frothing action from a new class of frothing agents.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
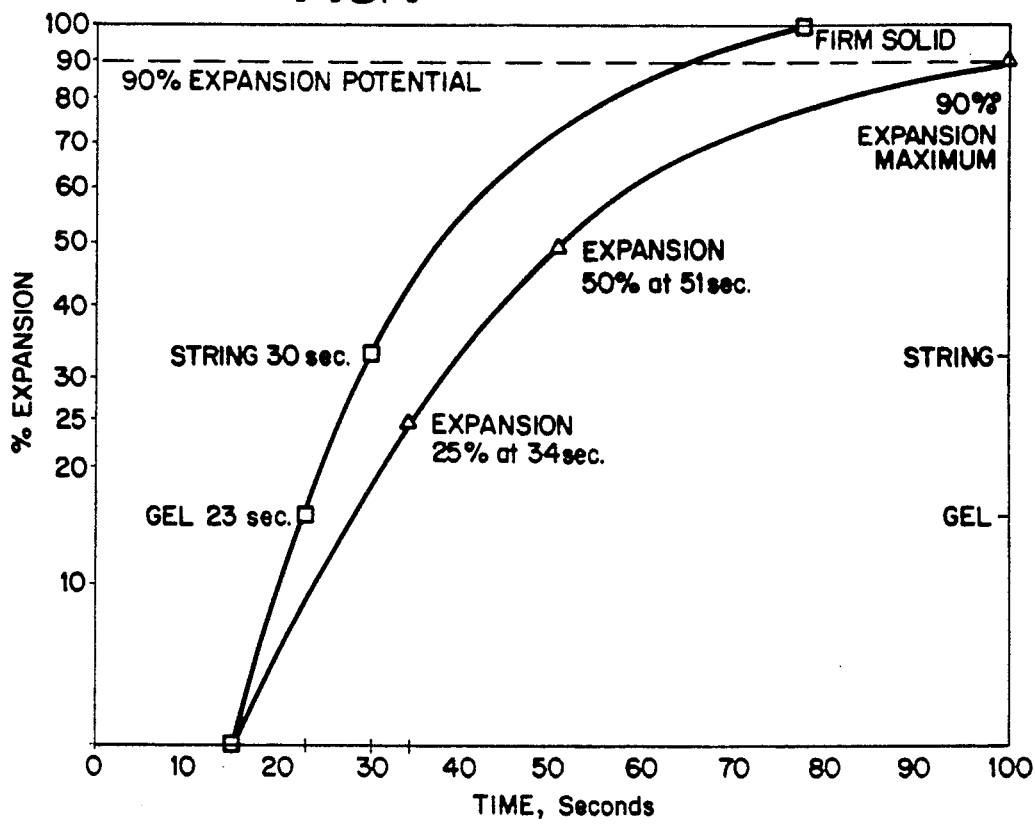
FIG. 1 is a graph showing foam production having a degree of completion of polymerization which is too fast for the degree of completion of expansion.

The method of the present invention is used to prepare foams which have isocyanurate linkages in them; i.e., no foams proposed herein have a chemical equivalent ratio of polyisocyanate to polyol of less than 1.5:1.0. The typical polyurethane foams using the normal urethane equivalent ratio of isocyanate to polyol of 1.0:1.0; such as used in refrigerators, coolers, etc.; does not have the need for a high exothermic heat source to promote the trimerization reaction. The flammability codes of building construction foam insulation require the isocyanurate linkage. While not usually needed in refrigerator type polyurethanes, the polyisocyanurate foam of the present invention is often needed in other types of rigid insulation foam. Thus all foams of the present invention have an equivalent ratio, or "Index", of polyisocyanate to polyol in excess of 1.5:1.0, and most preferably in the range 2.0:1.0 to 5.0:1.0.

In accordance with one mode of the invention, a first (i.e., "A-Blend") of two foam forming blends is prepared using at least polymeric polymethylene polyphenylisocyanate. A second (i.e., "B-Blend") of two foam forming blends is prepared by mixing together at least one polyol; a minor amount of water; a tertiary amine catalyst having at least one ethyl ($-CH_2-CH_2-$) linkage between two heteroatoms (the heteroatoms being chosen from the group consisting of Nitrogen and Oxygen); and, an alkali metal organo-salt catalyst. The amount of alkali metal organo-salt catalyst mixed in the blend is greater than about 0.9 weight percent of the total weight of the resultant foam.

A first blowing agent is included in at least one of the two foam forming blends. When the first and second foam forming blends (the A-Blend and the B-Blend, respectively) are mixed together, the tertiary amine quickly initiates a reaction of water with the polymeric polymethylene polyphenyl isocyanate but does not quickly initiate a reaction of polyol with the polymeric polymethylene polyphenylisocyanate. This water-PMDI reaction produces a second blowing agent (carbon dioxide, $CO_2$) which forms cells in the blends and expands the blends prior to a Gel Point occurring in the urethane polymerization reaction. Moreover, the water-PMDI reaction initiated by the tertiary amine catalyst produces exothermic heat sufficient to initiate boiling of the first blowing agent.

The method of the present invention produces $CO_2$ for the purpose of foam expansion in such a manner that the degree of completion of expansion quickly moves ahead of the degree of completion of the chemical reactions. The degree of completion of expansion is greater than the degree of completion of the chemical reactions substantially throughout the foam production process.

Inclusion of such a large amount of alkali metal organo-salt catalyst enables the mixture of blends to obtain an exothermic heat sufficient for further vaporizing the first blowing agent, including some relatively high boiling point blowing agents. The vaporization of the first blowing agent in turn forms further cells in the blends and further expands the blends whereby expansion of the mixed blends is substantially complete prior to completion of the polymerization and cross-linking reactions.

As mentioned above, it is important to have the many complex chemical reactions timed with the foam expansion. The terms "Cream", "Gel", and "String" have been used to describe stages of the chemical reactions leading up to the formation of "Firm, Solid" isocyanurate foam. "Firm, Solid" foam occurs when there is about 90% or more completion of the three dimensional polymerization and cross-linking formation. Foam is said to be "Firm, Solid" where it is solid enough that it does not visibly move upon external application of a vibratory force.

"Cream Time", usually contracted to "Cream", means the length of time (in seconds after mixing is started) that is required before any activity is noted in the liquid chemical mixture of A- and B-Blends. Usually, the first activity noticed is the expansion. However, when a frothing agent is utilized in a pressurized foam machine the essentially no delay before expansion begins. Nevertheless, at lower addition levels of frothing agent, the initialization of $CO_2$ blowing expansion can be detected.

The "Gel Point", or just "Gel", means the length of time that is required before the chemical reactions cause the material to show the first sign of losing pure liquid characteristics, and to show the first sign of semi-liquid properties. In actual practice, the expanding foam is sliced with the thin edge of a wooden, medical tongue depressor once every second to see if the slice immediate closes on itself (still liquid) or if the sliced plane remains separated (semi-solid).

The "String Point", or "String", means the length of time required for the urethane polymerization and some isocyanurate cross-linking reactions to proceed far enough that the same wooden tongue depressor will "pull" a "string of material" from the surface of it. In actual practice, the flat side of the wooden depressor is placed against the expanding foam once every second, and quickly pulled away. The String Point is the point at which the material will stick to the wood, and will leave a trail of string(s) behind it as it is quickly pulled away. The foam is able to continue expanding beyond the String stage, but with increasing difficulty. It is advantageous to effect as much closed cell expansion as possible before the "Firm Solid" stage is reached.

FIGS. 1, 2, 3, and 4 generally represent important relationships between the degree of completion of expansion and the degree of completion of chemical reactions such as polymerization and cross-linking. FIGS. 1-4 show two dimensional graphs of curves which plot time on the "x" (horizontal) axis and either the "expansion" event or the "chemical reactions" event on the "y" (vertical) axis. Each of these concurrent "events" are, at any given point in time, in one stage or another of completion (from start to finish). The degree of completion has been depicted by the vertical axis shown in logarithmic increments from zero (0) stage of completion to 100% stage of completion. The degree of completion is defined as a point on the "y" ordinate. The actual "rate" is defined as the slope of the curve at any given point on the curve. These curves indicate that in the early stages (first 30 seconds) of either event, the "rate" of completion is quite rapid; i.e., the slope is steep. However, in the second 30 seconds, the slope becomes more gradual. Thus, for the second 30 seconds, in all examples of foam expansion and thermosetting chemical reaction of this invention, the rate decreases smoothly (or, "the event decelerates smoothly").

FIG. 1 depicts an expansion/chemical reactions relationship which is not acceptable because the chemical reaction degree of completion is so fast, or the expansion degree of completion so slow, or some of each, that a firm solid becomes formed before the expansion can reach its full potential. The conditions depicted by FIG. 1 create a foam density which is too high for good insulating properties.

Figure 2:
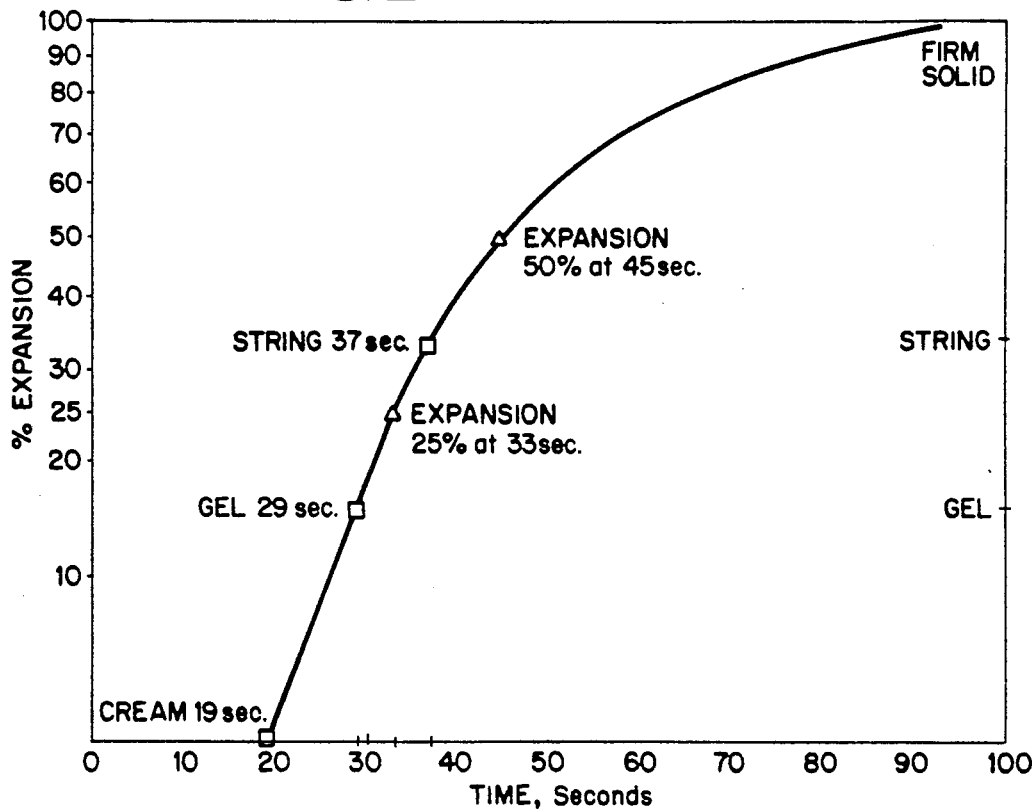
FIG. 2 is a graph showing timing relationships for prior art foam production utilizing CFC-11.

FIG. 2 depicts the normal prior art timing relationship whereby the degree of completion of expansion and the degree of completion of curing both proceed together.

Figure 3:
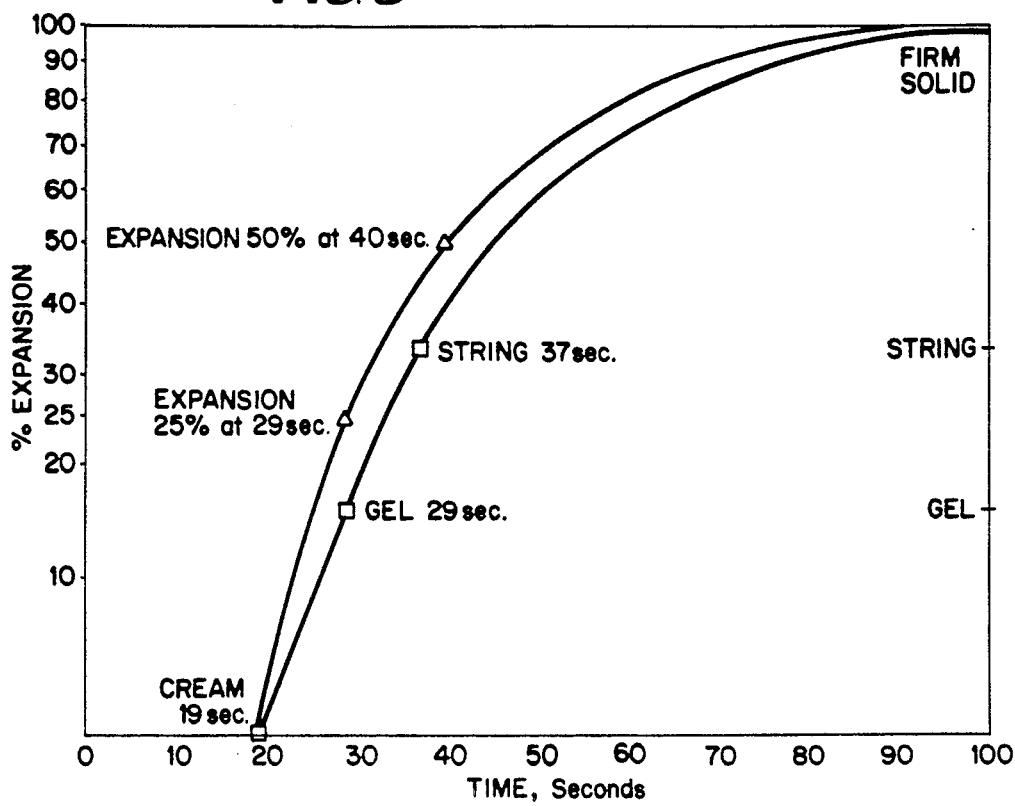
FIG. 3 is a graph showing degrees of completion for foam chemical reactions and foam expansion for a process according to a mode of the invention.

FIG. 3 represents an improvement of the present invention whereby the expansion degree of completion is ahead of the chemical reaction degree of completion. This method of producing $CO_2$ expansion causes the degree of completion of expansion to quickly and permanently move ahead of the degree of completion of reactions. As long as the cell wall strength is maintained, this condition virtually assures that the closed cell foam reaches the maximum expansion potential available.

The importance of FIG. 3 as compared to FIGS. 1 and 2 is that the "expansion" curve has an earlier starting time. In addition, at any given point on the completion ("y") axis, the degree of expansion completion is ahead (in seconds) of the degree of chemical reaction completion.

Figure 4:
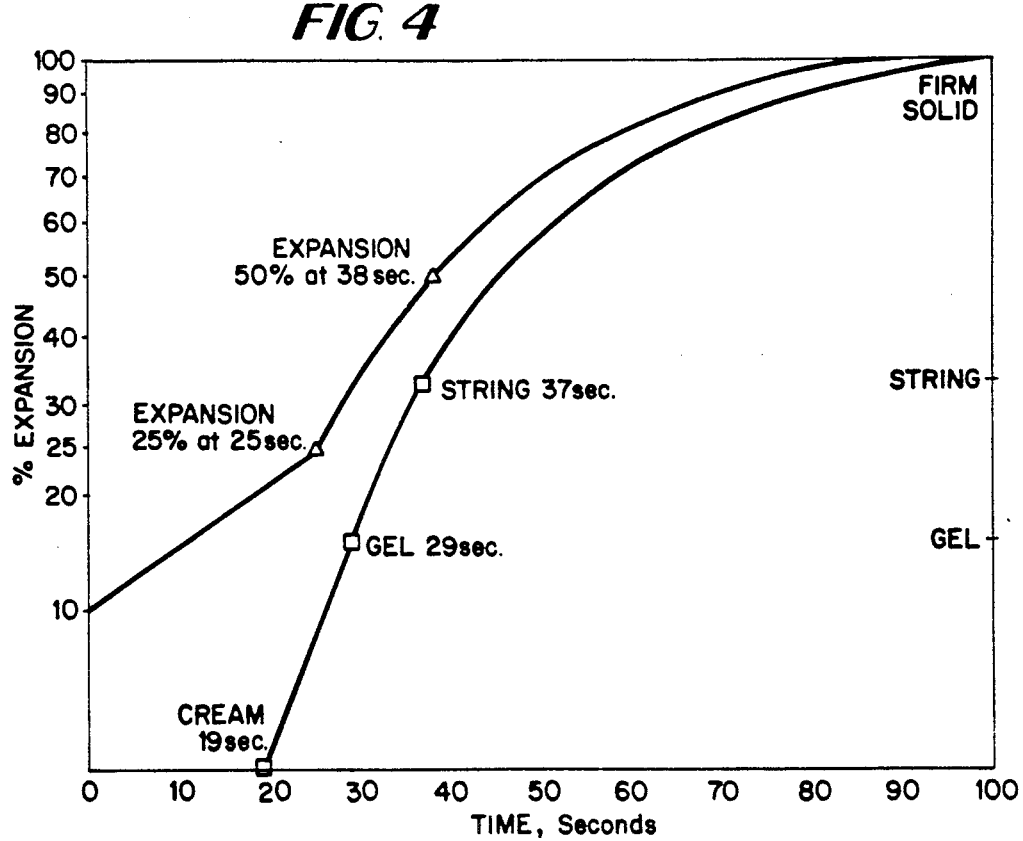
FIG. 4 is a graph showing degrees of completion for foam chemical reactions and foam expansion for a process according to a mode of the invention including a frothing agent.

FIG. 4 depicts the improvements noted in FIG. 3, with the additional improvement that the expansion degree of completion is enhanced with an additional permanent head-start over the chemical reaction degree of completion by the use of a frothing agent.

The method depicted in FIG. 3 by which the degree of foam expansion is caused to proceed ahead, and stay ahead, of the degree of chemical reactions is characterized as follows:

(1) The early foam expansion is created by quickly forming $CO_2$ blowing agent without allowing many isocyanate groups to react with hydroxyl groups;

(2) The smooth continuation of foam expansion by some vaporization of the blowing agent from the exothermic heat of the water-isocyanate reaction;

(3) The continued expansion from boiling blowing agent from the exothermic heat of the chemical reactions being driven by a large amount of catalyst.

The present invention requires the use of tertiary amine catalysts having a double-carbon (ethyl) linkage between two heteroatoms of Nitrogen and Oxygen. The processes of this invention rely upon the alkali metal organo-salt catalyst to initiate the urethane polymerization reaction. The alkali metal organo-salt catalyst offers more delay time prior to starting the urethane reaction than an ordinary urethane tertiary amine catalyst. By substantially covering the special tertiary amine catalyst molecules of this invention with water molecules via hydrogen bonding, their urethane reaction catalyzing power is hindered until the water molecules have been removed therefrom. The combination of a tertiary amine catalyst use is restricted to those having a carbon-carbon (ethyl) linkage between two heteroatoms and adequate water causes both an increase in the expansion degree of completion via $CO_2$ production and an increase in the expansion via exothermic temperature. This method makes it virtually impossible for the chemical reactions degree of completion to overcome the expansion degree of completion.

The foams of the present invention have at least one tertiary amine catalyst, which catalyst has at least one ethyl ($-CH_2-CH_2-$) linkage between a tertiary amine group and either an ether-oxygen ($-O-$) or another tertiary amine group. Both ether-oxygen and tertiary amine are strong hydrogen bonding sites. For purposes of definition, all the nitrogen atoms and the oxygen atom of these compounds shall be referred to herein as "Heteroatoms." As described in a paper by N. Malwitz, P. A. Manis, S.-W. Wong and K. C. Frisch, entitled "Amine Catalysis of Polyurethane Foams", given at the 30th ANNUAL POLYURETHANE CONFERENCE, Oct. 15-17, 1986, this class of tertiary amine catalysts has a preferential activity for the water-PMDI reaction.

When such a catalyst is mixed with water in a B-Blend, the ethyl linkage between two heteroatoms is just the right length to assure that a water molecule will be advantageously fitted there; and will thus be the first reaction when final mixing with PMDI is effected. Ordinary catalysts with such linkages include, but are not limited to the following: dimethylethanolamine (DMEA), trimethylhydroxyethyldiamine, triethylenediamine (TEDA), Bis(2-Dimethylaminoethyl)ether, pentamethyldiethylenetriamine, and variations of this basic structure.

The DMEA molecule and trimethylhydroxyethyldiamine have an active hydroxyl group, thus they react with PMDI, which has the effect of reducing catalyst level as well as increasing the need for more PMDI. The structural makeup of TEDA is such that water cannot bridge between both amine groups, thus it does not hydrogen bond well with water. Thus the most preferred catalysts from this group include: pentamethyldiethylenetriamine (Polycat-5) and bis(2-dimethylaminoethyl)ether (Dabco BL-19). Pentamethyldiethylenetriamine (Polycat-5) has the structure:

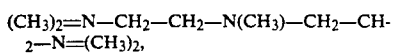

while the structure

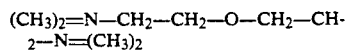

defines bis(2-dimethylaminoethyl)ether (Dabco BL-19).

Thus it can be said that these substantially linear structures render the molecules very selective to hydrogen bonding with the water molecule. This assures that the water quickly reacts with the very active isocyanate functional group. These strong amines are able to initiate the reaction of isocyanate groups with the hydroxyl functional groups of the polyols; however, as long as they have water molecules attached to them by hydrogen bonding, the urethane reaction will be subordinated to the reaction between water and isocyanate.

In prior art, Dabco BL-19 has been used by the flexible foam industry to catalyze the reaction of TDI (Toluene Di-Isocyanate) with water. The flexible foam manufacturers have used $CO_2$ to blow this open celled foam for many years. The water-TDI reaction catalyzed by these selective catalysts can produce $CO_2$ rapidly enough to cause cell wall rupture, which is desirable in flexible foam but not rigid insulating foam. Thus it can be seen that rapid expansion in any form can be harmful to the production of closed-cell rigid foam for insulation.

The organo-salt catalyst of the present invention can be any form of alkali metallic cation linked with an organic anion. The preferred alkali metallic cation is potassium, however, the sodium cation is workable. The preferred potassium organo-salt catalysts used in the present invention are potassium 2-ethyl hexanoate (potassium octoate) and potassium acetate.

Potassium acetate may be used if a faster chemical reactivity profile is desired than can be provided by potassium octoate. However, an advantage taught in the instant invention, is a method to delay chemical reactions while the expansion is proceeding. Furthermore, when utilizing the higher levels of potassium, the higher molecular weight form; e.g., potassium 2-ethyl hexanoate (potassium octoate) provides a smoother chemical reaction profile than potassium acetate. Thus, potassium octoate is the preferred organo-salt catalyst of the present invention.

Prepared potassium organo-salt catalysts are commercially available as Dabco K-15, Polycat 46, Hexchem 977, and PEL-CAT 9540A. A unique feature of the present invention is that the organo-salt catalysts are utilized in greater amounts than in prior art rigid foams. Whereas prior art formulations generally called for levels having been below about 0.9% on a total weight percent basis of the entire foam, the present invention uses levels above about 0.9% of total weight. On a "per hundred parts of polyol" basis, the minimum amount used in the scope of this invention is about 3.00 pphp. The increased amount insures that the exothermic reactions will proceed rapidly as well as reaching the highest temperatures possible. Thus, the invention utilizes the highest amounts of organo-potassium catalyst ever before utilized in connection with the preparation of rigid foam. Both the urethane reaction as well as the trimerization reaction must be well driven by the highest exothermic heat energy possible when utilizing either high boiling point blowing agents, or frothing agents which cool the chemicals, or utilizing both together.

In some embodiments a blowing and catalyst package comprised of potassium hydroxide, water, and 2-ethyl hexanoic acid may suffice for the required water and organo-potassium catalyst portion of the B-Blend of the present invention. Both water (for $CO_2$ blowing), and a potassium organo salt catalyst are required components of the present invention, and therefore may be added as a pre-blended mixture of water, potassium hydroxide, and a carboxylic acid.

The blowing agents of the invention can be any material which is inert to the reactive chemicals and has a boiling point at one atmosphere of pressure in excess of about 10 degrees Celsius, up to about 50 degrees Celsius. The frothing agents can be any material which is inert to the reactive chemicals and has a boiling point at one atmosphere of pressure from about minus fifty degrees Celsius ($-50°$ C.) up to about plus ten degrees Celsius ($+10°$ C.).

All foams of the present invention contain at least two expansion agents. One of the two expansion agents is always the blowing agent $CO_2$. When the other expansion agent is a blowing agent, that other agent is chosen from the group consisting of ordinary hydrocarbons and other organic or inorganic compounds, $CCl_3F$, $CF_3CHCl_2$, $CH_3CCl_2F$, and those novel azeotropic blowing agent mixtures disclosed in U.S. patent application, Ser. No. 07/568707, filed Aug. 17, 1990 (which patent application is hereby incorporated herein by reference). These blowing agents include partially hydrogenated chlorofluorocarbons, sometimes called hydrochlorofluorocarbons, and are usually referenced by the contraction "HCFCs". They also include CFC-11 ($CCl_3F$).

Some, but not all, foams of the instant invention contain a frothing agent in addition to a blowing agent. When used, the frothing agent is selected from the group consisting of $CHClF_2$, $CH_3CClF_2$, $CHClFCF_3$, $CF_3CH_2F$, and $CH_3CHF_2$, ordinary hydrocarbons, and other chemical compounds with boiling points between about $-50°$ C. and about $+10°$ C., which are inert to the reactive foam forming chemicals. This group includes some HCFCs, but it also includes non-chlorine containing hydrofluorocarbons, or just "HFCs". The preferred frothing agent is monochlorodifluoromethane, HCFC-22, with the formula $CHClF_2$.

When any higher boiling point blowing agents (e.g., HCFC-141b or HCFC-123, for example) are utilized in the processes of the present invention, a frothing agent need not be necessarily employed. The preferred HCFC blowing agent is HCFC-141b because, for one reason, it requires less weight percentage added than does CFC-11. This occurs because the amount of blowing potential is a function of the molecular weight of the compound. The lower the molecular weight, the more molecules there are per pound of material. Therefore, more blowing potential exists in lower molecular weight blowing agents. The prior art compound CFC-11 has a molecular weight of 137.4, while HCFC-141b has a 117.0 molecular weight. In planning to replace CFC-11 with HCFC-141b, the amount of HCFC-141b to use must be reduced to 85.15% (117/137.4) of the previous CFC-11 weight.

A major advantage of using a low molecular weight frothing agent is likewise the reduction in amount needed. The frothing agent, HCFC-22, has a molecular weight of 86.5. When using HCFC-22 in place of CFC-11, the theoretical weight reduction would be 86.5/137.4, or about 63% of the CFC-11 needed. However, due to the rapid evaporation of HCFC-22, which causes the potentially harmful cooling effect, the rate actually needed is from about 75% to about 80% of the prior art CFC-11 addition rate.

Some examples of frothing and blowing agents of the present invention include, but are not limited to, those shown in Table 1.

TABLE 1

| Product | Formula | M.W. | B.P. (°F.) | Name |
|---|---|---|---|---|
| Frothing Agents | | | | |
| HCFC-22 | $CHClF_2$ | 86.5 | $-41.4$ | monochlorodifluoromethane |
| HCFC-142b | $CH_3CClF_2$ | 100.5 | $+14.4$ | monochlorodifluoroethane |
| HCFC-124 | $CHClFCF_3$ | 136.5 | $+12.2$ | monochlorotetrafluoroethane |
| HFC-134a | $CF_3CH_2F$ | 102.0 | $-15.7$ | tetrafluoroethane |
| HFC-152a | $CH_3CHF_2$ | 66.0 | $-12.5$ | difluoroethane |
| Blowing Agents | | | | |
| HCFC-141b | $CCl_2FCH_3$ | 117.0 | $+89.6$ | dichloromonofluoroethane |
| HCFC-123 | $CF_3CHCl_2$ | 152.9 | $+82.2$ | dichlorotrifluoroethane |
| CFC-11 | $CCl_3F$ | 137.4 | $+74.9$ | trichloromonofluoromethane |

As mentioned above, novel azeotropic blowing agents are disclosed in U.S. patent application, Ser. No. 07/568707, filed Aug. 17, 1990, incorporated herein by reference. Those novel azeotropic blowing agents, as well as the individual chemical compounds named in the azeotropes, are also suitable for use with the present invention.

Any prior art polyester polyol may be used in the polyurethane modified polyisocyanurate rigid foam of this invention. Prior art polyols have been made quite miscible with CFC-11, which is a poorer solvent than the new HCFCs. The stronger solvent action of the HCFCs create a B-Blend with those polyols which has a very low viscosity. It may be too low for quality foam cell structure. This can be true even when using lower weight percentages of the HCFCs. The preferred polyester polyols used in connection with the present invention have a viscosity and solubility characteristics which produce blend viscosities between about 250 cps and about 1500 cps; and most preferably between about 450 cps and about 750 cps at the temperature used in manufacturing. If the preferred range of viscosity cannot be achieved at normal blend temperatures, the temperatures are changed to accommodate the needed viscosity. The preferred polyols also have a hydroxyl number between about 150 and about 300, and an average functionality between about 1.9 and about 3.0.

As it turns out, when HCFC-141b is added at a rate of 85% of CFC-11 to almost any prior art polyol, the resulting viscosity of the polyol is lower than it was at 100% CFC-11. In fact, in certain polyols, even when reducing the HCFC-141b level another 25% below the 85% of CFC-11 level, the resulting viscosity can be lower than it was with 100% CFC-11. The reason the amount of HCFC is reduced an additional 25% is in order to make room for the $CO_2$ blowing from the reaction of water and PMDI.

It has been found advantageous when using higher boiling point HCFCs to maintain chemical temperatures higher than they were with CFC-11, which boils at room temperature. As mentioned earlier, HCFCs with prior art polyols will produce B-Blends with viscosities too low for good cell formation, especially if used at temperatures higher than 75° F. It is necessary under all conditions to keep the blend viscosity in the optimum range. Therefore, a double dilemma is faced by the need to run high boiling point HCFCs at higher temperatures, plus the fact that the HCFCs create a B-Blend viscosity which is already too low. There are two ways to compensate: (1) The use of polyols which are less compatible with HCFCs, or are more viscous on their own, or are some of both; (2) The use of the frothing agent technique which produces a higher "apparent viscosity" due to the microcellularization of cells. However, the use of a frothing agent can likewise lead to cell wall rupture as described above. Fortunately, this problem may also be alleviated by the use of more viscous polyols.

Polyols in this category are commercially available, but have not been used as the major component in the B-Blend for polyurethane modified polyisocyanurate foam. Some examples include, but are not limited to, Terate 203, Terate 253, and Terate 214 as sold by Cape Industries, Wilmington, N.C.; and Stepanpol PS-2402, Stepanpol PS-2002 as sold by Stepan Chemical Company, Northfield, Ill., and experimental Stepan Agent X-1507-xx. Processes of some modes of this invention specifically use the high boiling point HCFCs with higher viscosity polyester polyols, or less compatible polyester polyols, or those polyols being both, and use them at temperatures above the boiling point of CFC-11; e.g., above 75° F.; and still maintain a suitable B-Blend viscosity. Likewise, processes of some modes of this invention specifically utilize polyols with unusually high viscosities with frothing agents in order to maintain better cell wall integrity.

All B-Blends of the instant invention contain some water. The theoretical minimum amount of water required is defined as the minimum amount needed to provide one molecule of water for each double-carbon ethylene linkage available within the tertiary amine molecules. In real life, the amount of water needed is much higher than that. The amount to be included depends on the amount of $CO_2$ to be produced.

Say, for example, a minimum amount of gas volume replacement of 10% had been established. In order to produce enough $CO_2$ to substitute for or replace about 10% (on a gas volume basis) of a conventional blowing agent (such as CFC-11) in a low density (sheathing) foam with a 2.1 "Index", about 0.50 pphp of water is included. (The contraction "1.0 pphp" means "one part per hundred polyol".) Depending on the Index and density of the foam, from about 0.5 to 2.5 pphp of water is included for about a 25% replacement. Over 3.0 pphp of water may be included for a higher Index foam using about 50% replacement.

In order to effectively complete a trimerization reaction, it is essential to reach a exotherm temperature in excess of 250° F., and preferably at least 275° F. should be reached. Thus, all foams of the instant invention produce an exothermic temperature in excess of 250° F. as measured in a free-rise box-pour of at least 250 grams total weight. The mass of the sample, location of the thermocouple, and the ambient conditions have a large effect of the exothermic temperatures recorded. The cooling effect of a prior art foam utilizing CFC-12 as an evaporating frothing agent has been reported to have reduced the exotherm temperature to below 250° F.

When using HCFC-22 in the B-Blend, most polyester polyols hydrogen bond with HCFC-22. This hydrogen bonding keeps the vapor pressure of the B-Blend low. B-Blends using low levels of HCFC-22, generally below 15% by weight, have normal operating pressures. When using HCFC-22 in the A-Blend, only about 5% by weight can be added and maintain normal operating pressures. The use of high pressure mixing equipment is not necessary for blends, but must be used where the HCFC-22 is stored, weighed and added into the B-Blend.

It is possible to add both HCFC-22 and a fluorocarbon blowing agent to the same blend. However, adding more fluorocarbon will tend to force the HCFC-22 out of solution. In utilizing other fluorinated products, they have the same effect as adding more HCFC-22 by taking up the hydrogen bonding sites on the organic compounds. Thus, the combination of HCFC-22 and fluorocarbon blowing agent becomes the same maximum amount of pure HCFC-22 which is possible to add.

In one embodiment of the present invention, the HCFC-22 frothing agent is added to the B-Blend, and HCFC-141b is added to the A-Blend. In another preferred embodiment, the HCFC-22 frothing agent is added to the A-Blend, and HCFC-141b is added to a more viscous, less compatible polyester polyol, such as Stepanpol 2402. In another preferred embodiment, both HCFC-22 and HCFC-141b are added to the B-Blend, which may use any polyester polyol taught herein, or taken from the prior art.

RIGID FOAM PRODUCTS

All foams of the present invention have physical properties well within the requirements of the Federal Specification HH-I-1972/GEN. Likewise, the thermal conductivity of some of the foams made with the HCFC-22 frothing agent and the HCFC-141b blowing agent appears to be about as good as the prior art foams made entirely with CFC-11. The intrinsic thermal resistance of HCFCs is not as good as the thermal resistance of CFC-11; however, the foam cell formation is greatly improved when frothing with HCFC-22. It is assumed that the smaller molecule, well distributed, has a nucleating effect which creates a very small, round, cell structure. This was referred to earlier as "microcellularization".

The foams of the present invention are all foams which have isocyanurate linkages in them; i.e., all foams proposed herein have a chemical equivalent ratio of polyisocyanate to polyol in excess of about 1.5:1.0.

The present invention is further illustrated by the following examples in which all parts and percentages are by weight unless otherwise indicated.

Foam Example No. 1

Figure 5:
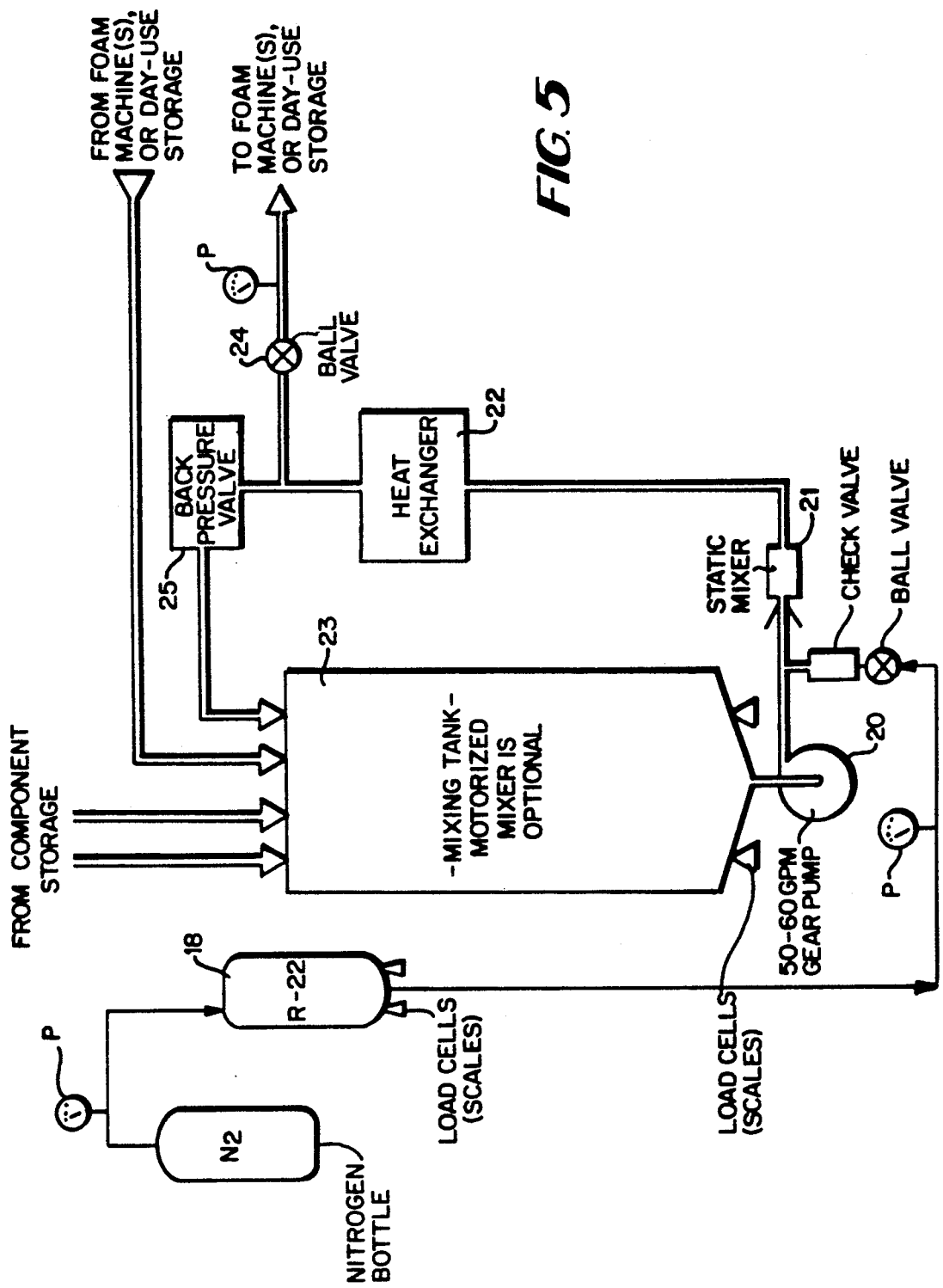
FIG. 5 is a schematic view of apparatus for foam production in accordance with a mode of the invention in which a frothing agent is included.

A high pressure impingement mixing machine was used for the foam examples. HCFC-22 was added in accordance with the apparatus shown in FIG. 5. FIG. 5 shows that liquid HCFC-22 (also known as "R-22") was fed from a tank 18 to a downstream side of a large gear pump 20. The gear pump 20 was used to pump the B-blend. From the downstream side of the pump 20, the B-blend was pumped through a static mixer 21, through a heat exchanger 22, and (when ball valve 24 was closed) to a 250 gallon mixing tank 23. The outlet of tank 23 fed the intake of pump 20. When the ball valve 24 was opened, a back pressure valve 25 caused the mixture to be directed to the high pressure foam machines whereat the B-blend was mixed with the A-blend. The tank and heat exchanger were rated at 150 psig pressure, but the pressure gauges never exceeded about 80 psig, which is the normal operating pressure used to feed Bosch high pressure foam machine pumps. As the mixture blended well, and was cooled by the heat exchanger, the pressure dropped even as the amount of HCFC-22 in the blend was increased. The pressure at 14.1% HCFC-22, and at about 65° F., was about 45 psig. Dry air pressure was added to the system to increase the pressure to insure that the high pressure Bosch pumps would not become "starved" for liquid material.

The formulations and results of Foam Example No. 1 are provided below:

| Component | Pbw | Characteristics |
|---|---|---|
| Stepanpol 2502 | 100.00 | Equivalent "Index" = 2.4 |
| Pluracol 975 | 15.00 | Free Rise Density = 1.64 PCF |
| Surfactant | 3.00 | String at 70° F. = 21 secs. |
| Dabco K-15 | 7.50 | 1.5" Board Density = 1.8 PCF |
| Polycat-5 | 0.25 | Initial k-factor = 0.13 |
| Water | 2.25 | Laminator Temp. = 145° F. |
| HCFC-22 | 21.00 | |
| TOTAL B-Blend | 149.00 | |
| PMDI | 273.50 | |
| CFC-11 | 24.00 | |
| DC-5098 | 1.00 | |
| TOTAL A-Blend | 298.50 | |

Foam Example No. 2

Using a typical laboratory high pressure foam machine, following the same blending procedure for HCFC-22 as taught in the production trial of Example 1, the following foam was made with the indicated results:

| Component | Pbw | Characteristics |
|---|---|---|
| Stepanpol 2502 | 100.00 | Equivalent "Index" = 2.2 |
| P. E. Glycol 400 | 10.00 | Free Rise Density = 1.75 PCF |
| Surfactant | 3.00 | String at 70° F. = 19 secs. |
| Dabco K-15 | 6.00 | Closed Box Density = 2.09 PCF |
| Polycat-5 | 0.20 | Initial k-factor = 0.1187 |
| Water | 1.43 | Dimensional Stability Tests: |
| HCFC-22 | 17.50 | 158° F. & 97% RH, 24 Hours: |
| TOTAL B-Blend | 138.13 | % Volume Change = +0.723% |
| PMDI | 194.00 | −40° F., 24 Hours: |
| CFC-11 | 16.10 | % Volume Change = −0.419% |
| DC-5098 | 1.00 | |
| TOTAL A-Blend | 211.10 | |

Foam Example No. 3

This example shows an early attempt at using HCHC-141b in place of CFC-11. The blowing efficiency was better than expected, thus the free rise density was too low. It used the same laboratory high pressure foam machine, and the same blending procedure for HCFC-22 as in Examples 1 and 2:

| Component | Pbw | Characteristics |
|---|---|---|
| Stepanpol 2502 | 100.00 | Equivalent "Index" = 2.2 |
| Pluracol 975 | 10.00 | Free Rise Density = 1.36 PCF |
| Surfactant | 3.00 | String at 72° F. = 23 secs. |
| Dabco K-15 | 7.00 | Closed Box Density = |
| Polycat-5 | 0.30 | Abandoned |
| Water | 2.21 | Initial k-factor = |
| HCFC-22 | 20.00 | Abandoned due to low |
| TOTAL B-Blend | 142.51 | free rise density |
| PMDI | 240.00 | |
| HCFC-141b | 20.80 | |
| DC-5098 | 1.00 | |
| TOTAL A-Blend | 261.80 | |

Foam Example No. 4

This example shows the first attempt to increase the density of the foam from Example 3. Both the blowing agents, $CO_2$ and HCFC-141b, were reduced; as was the frothing agent. It used the same laboratory high pressure foam machine, and the same blending procedure for HCFC-22 as in prior examples:

| Component | Pbw | Characteristics |
|---|---|---|
| Stepanpol 2502 | 100.00 | Equivalent "Index" = 2.2 |
| Pluracol 975 | 10.00 | Free Rise Density = 1.40 PCF |
| Surfactant | 2.50 | String at 72° F. = 22 secs. |
| Dabco K-15 | 6.80 | Closed Box Density = 1.60, |
| Polycat-5 | 0.28 | 1.82 & 2.04 |
| Water | 2.00 | |
| HCFC-22 | 18.30 | |
| TOTAL B-Blend | 139.88 | |
| PMDI | 231.00 | |
| HCFC-141b | 18.70 | |
| DC-5098 | 1.00 | |
| TOTAL A-Blend | 250.70 | |

Foam Example No. 5

This example shows the frothing agent going into the A-Blend instead of B-Blend, with the HCFC-141b going into the B-Blend utilizing a polyester polyol which has poor miscibility with CFC-11, and is about 3 times more viscous than PS-2502. It used the same laboratory high pressure foam machine, and the same blending procedure for HCFC-22 as in prior examples:

| Component | Pbw | Characteristics |
|---|---|---|
| Stepanpol 2502 | 100.00 | Equivalent "Index" = 2.4 |
| Surfactant | 3.00 | String at 77° F. = 16 secs. |
| Dabco K-15 | 7.00 | Free Rise Density = 1.49 |
| Polycat-5 | 0.30 | |
| Water | 1.75 | |
| HCFC-141b | 22.00 | |
| TOTAL B-Blend | 134.05 | |
| PMDI | 221.00 | |
| HCFC-22 | 8.84 | |
| DC-5098 | 1.00 | |
| TOTAL A-Blend | 230.84 | |

Foam Examples Nos. 6A & 6B

These examples show two non-CFC-11 production run foams, made without a frothing agent. The same production equipment used in Example 1 was used for this run. These foams had poor green strength, which caused expansion for several hours, followed by severe board shrinkage. This dimensional excursion was so serious in many of the laminated boards that it caused the facer to tear loose. Also this foam has a coarse cell structure, giving it a marginal R-Value. While some of the better samples of these laminated foam boards eventually cured and demonstrated a respectable dimensional stability, their short-term lack of green strength makes this example commercially undesirable. The main trial runs were made with 100% HCFC-123 or 100% HCFC-141b as follows:

| Component | 6A | 6B |
|---|---|---|
| Polyester Polyol | 100.00 | 100.00 |
| Silicone Surfactant | 3.00 | 3.00 |
| Potassium Octoate | 3.11 | 2.76 |
| Amine Catalyst | 1.12 | 0.91 |
| HCFC-123 | 53.00 | — |
| HCFC-141b | — | 43.00 |
| Total: | 160.23 | 149.67 |
| PMDI | 188.00 | 185.00 |
| Total: | 348.23 | 334.67 |
| Index; | 3.0 | 3.0 |
| Cream, Seconds: | 15" | 17" |
| Gel, Seconds: | 19" | 24" |
| String, Seconds: | 25" | 34" |
| Tack Free, Seconds: | 44" | 45" |
| 100% Rise, Seconds: | 98" | 98" |
| Initial k: | 0.13 | 0.14 |

Foam Examples Nos. 7A, 7B, & 7C

These examples show some production run foams, made on the production equipment of Example 1 and Example 6. The foams of Examples Nos. 7A, 7B, & 7C utilized the higher exothermic heat taught in this invention for the implementation of excellent green strength, improved cell structure, better k-factors, and good dimensional stability developed within 24 hours of production.

| Component | 7A | 7B | 7C |
|---|---|---|---|
| Stepanpol PS-2402 | 100.00 | 100.00 | — |
| Terate D-214 | — | — | 100.00 |
| Propylene Carbonate | 4.00 | 4.00 | 5.00 |
| Silicone Surfactant | 2.00 | 2.00 | 2.00 |
| Dabco K-15 | 4.60 | 3.10 | 3.30 |
| Polycat 5 | 0.51 | 0.15 | 0.18 |
| Water | 3.31 | 0.54 | 0.59 |
| HCFC-141b | 15.60 | 24.60 | 26.60 |
| Total B-Blend: | 130.02 | 134.39 | 137.67 |
| PMDI | 275.00 | 167.00 | 185.50 |
| HCFC-141b | 5.50 | 6.26 | 6.96 |
| DC-5098 | 1.00 | 0.75 | 0.83 |
| Total A-Blend: | 281.50 | 174.01 | 193.29 |
| Total Blends: | 411.52 | 308.40 | 330.96 |
| Index: | 2.4 | 2.4 | 2.4 |
| Cream, Secs: | 17" | 18" | 18" |
| Gel, Secs: | 29" | 26" | 25" |
| String, Secs: | 37" | 34" | 31" |
| Tack Free Secs: | 48" | 41" | 42" |
| Max. Rise Secs: | 90" | 96" | 76" |
| Free Rise Density: | 1.73 | 1.75 | 1.76 |
| Initial k: | 0.130 | 0.127 | 0.133 |

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of producing a rigid thermosetting foam, the method comprising the steps of:
   (1) preparing a first of two foam forming blends using polymeric polymethylene polyphenylisocyanate:
   (2) preparing a second of two foam forming blends by mixing together;
      (a) a polyol;
      (b) water in an amount less than 1% by weight of the total foam;
      (c) a tertiary amine catalyst having at least one ethyl ($-CH_2-CH_2-$) linkage between two heteroatoms, the heteroatoms being chosen from the group consisting of Nitrogen and Oxygen;
      (d) an alkali metal organo-salt catalyst;
   (3) mixing a first blowing agent with one of the two foam forming blends;
   (4) mixing together the first and second foam forming blends whereby the following occurs:
      (a) the tertiary amine catalyst initiates a reaction between the water and the polymeric polyethylene polyphenylisocyanate whereby prior to a gel point of the foam:
         i) a second blowing agent is produced for forming closed cells in the blends and for causing expansion in the liquid blends;
         ii) sufficient exothermic heat is produced to initiate boiling of the first blowing agent; followed by
      (b) the alkali metal organo-salt catalyst induces rapid vaporizing of the first blowing agent due to a high level of exothermic heat, whereby expansion of the mixed blends is substantially completed prior to the effective conversion of the mixed liquid blends to a rigid solid, the alkali metal organo-salt catalyst being present in an amount sufficient to cause a sufficiently complete trimerization reaction.

2. The method of claim 1, wherein the tertiary amine catalyst causes the water to react with isocyanate to produce $CO_2$, thereby causing a degree of completion of expansion of the foam production at any point in time to exceed a degree of completion of chemical reactions of the foam production.

3. The method of claim 1, wherein the organo-salt catalyst is chosen from a group consisting of potassium 2-ethylhexanoate and potassium acetate.

4. The method of claim 1, further comprising a pre-blending of water, potassium hydroxide, and 2-ethyl hexanoic acid.

5. The method of claim 1, wherein the amount of organo-salt catalyst mixed in the blend is greater than about 0.9 weight percent of the total weight of the foam.

6. The method of claim 1, wherein the first blowing agent is selected from a group consisting of $CCl_2FCH_3$, and $CF_3CHCl_2$.

7. The method of claim 1, further comprising preparing at least one of said foam forming blends to include a frothing agent selected from a group consisting of $CHClF_2$, $CH_3CClF_2$, $CHClFCF_3$, $CF_3CH_2F$, and $CH_3CHF_2$.

8. The method of claim 1, wherein the polyol is a polyester polyol having a hydroxyl number between about 150 and 300.

9. The method of claim 1, wherein the polyol is a polyester polyol having an average functionality between about 1.9 and 3.0.

10. The method of claim 1, wherein the polyol is a polyester polyol having a viscosity over about 15,000 cps at 25° C.

11. A method of producing a rigid thermosetting foam, the method comprising the steps of:
   (1) preparing a first of foam forming blends using polymeric polyethylene polyphenylisocyanate;

(2) preparing a second of two foam forming blends by mixing together:
   (a) a polyol;
   (b) water in an amount less than 1% by weight of the total foam;
   (c) a tertiary amine catalyst having at least one ethyl ($-CH_2-CH_2-$) linkage between two heteroatoms, the heteroatoms being chosen from the group consisting of Nitrogen and Oxygen;
   (d) an alkali metal organo-salt catalyst;
(3) mixing a first blowing agent with one of the two foam forming blends;
(4) mixing a frothing agent with one of the two foam forming blends;
(5) mixing together the first and second foam forming blends whereby the following occurs:
   (a) the tertiary amine catalyst initiates a reaction between the water and the polymeric polyethylene polypohenylisocyanate whereby prior to a gel point of the foam:
      i) a second blowing agent is produced for forming closed cells in the blends and for causing expansion in the liquid blends;
      ii) sufficient exothermic heat is produced to initiate boiling of the first blowing agent; followed by
   (b) the alkali metal organo-salt catalyst induces rapid vaporizing of the first blowing agent due to a high level of exothermic heat, whereby expansion of the mixed blends is substantially completed prior to the effective conversion of the mixed liquid blends to a rigid solid, the alkali metal organo-salt catalyst being present in an amount sufficient to cause a sufficiently complete trimerization reaction; and,
   (c) said high level of exothermic heat is sufficient to substantially complete all potential chemical reactions in spite of the cooling caused by any evaporation of the frothing agent.

12. The method of claim 11, wherein the tertiary amine catalyst causes the water to react with isocyanate to produce $CO_2$, thereby causing a degree of completion of expansion of the foam production at any point in titme to exceed a degree of completion of chemical reactions of the foam production.

13. The method of claim 11, wherein the tertiary amine catalyst is chosen from a group consisting of dimethylethanolamine, pentamethyldiethylenetriamine, and bis(2-dimethylaminoethyl)ether.

14. The method of claim 11, wherein the organo-salt catalyst is chosen from a group consisting of potassium 2-ethylhexanoate and potassium acetate.

15. The method of claim 11, further comprising a preblending of water, potassium hydroxide, and 2-ethyl hexanoic acid.

16. The method of claim 11, wherein the amount of organo-salt catalyst mixed in the blend is greater than about 0.9 weight percent of the total weight of the foam.

17. The method of claim 11, wherein the first blowing agent is selected from a group consisting of $CCl_2FCH_3$, and $CF_3CHCl_2$.

18. The method of claim 11, wherein the frothing agent is selected from a group consisting of $CHClF_2$, $CH_3CClF_2$, $CHClFCF_3$, $CF_3CH_2F$, and $CH_3CHF_2$.

19. The method of claim 11, wherein the polyol is a polyester polyol having a hydroxyl number between about 150 and 300.

20. The method of claim 11, wherein the polyol is a polyester polyol having an average functionality between about 1.9 and 3.0.

21. The method of claim 11, wherein the polyol is a polyester polyol having a viscosity over about 150,000 cps at 25° C.

22. The polyurethane polyisocyanurate foam produced by the method of claim 1.

23. The polyurethane polyisocyanurate foam produced by the method of claim 11.

24. The method of claim 1, wherein the tertiary amine catalyst is chosen from a group consisting of dimethylethanolamine, pentamethyldiethylenetriamine, and bis(2-dimethyaminoethyl)ether.

25. A method of producing a rigid thermosetting foam, the method comprising the steps of:
(1) preparing a first of two foam forming blends using polymeric polymethylene polyphenylisocyanate;
(2) preparing a second of two foam forming blends by mixing together:
   (a) a polyol;
   (b) water in an amount less than 1% by weight of the total foam;
   (c) a tertiary amine catalyst having at least one ethyl ($-CH_2-CH_2-$) linkage between two heteroatoms, the heteroatoms being chosen from the group consisting of Nitrogen and Oxygen;
   (d) an alkali metal organo-salt catalyst;
(3) mixing a first blowing agent with one of the two foam forming blends;
(4) mixing together the first and second foam forming blends whereby the following occurs:
   (a) the tertiary amine catalyst initiates a reaction between the water and the polymeric polymethylene polyphenylisocyanate prior to initiating a polymerizing reaction between the polyol and the polymeric polymethylene polyphenylisocyanate; and,
   (b) the reaction between water and the polymeric polymethylene polyuphenylisocyanate produces a second blowing agent which causes a degree of completion of expansion of the mixed blends at any point in time to exceed a degree of completion of the chemical reactions such that expansion is substantially completed prior to the effective conversion of the mixed liquid blends to a rigid solid, the alkali metal organo-salt catalyst being present in an amount sufficient to cause a sufficiently complete trimerization reaction.

26. The method of claim 25, wherein the organo-salt catalyst is chosen from a group consisting of potassium 2-ethylhexanoate and potassium acetate.

27. The method of claim 25, further comprising a preblending of water, potassium hydroxide, and 2-ethyl hexanoic acid.

28. The method of claim 25, wherein the amount of organo-salt catalyst mixed in the blend is greater than about 0.9 weight percent of the total weight of the foam.

29. The method of claim 25, wherein the first blowing agent selected from a group consisting of $CCl_2FCH_3$, and $CF_3CHCl_2$.

30. The method of claim 25, further comprising preparing one of said foam forming blends to include a frothing agent selected from a group consisting of $CHClF_2$, $CH_3CClF_2$, $CHClFCF_3$, $CF_3CH_2F$, and $CH_3CHF_2$.

31. The method of claim 25, wherein the polyol is a polyester polyol having a hydroxyl number between about 150 and 300.

32. The method of claim 25, wherein the polyol is a polyester polyol has an average functionality between about 1.9 and 3.0.

33. The method of claim 25, wherein the polyol is a polyester polyol having a viscosity over about 150,000 cps at 25° C.

34. The method of claim 25, wherein the tertiary amine catalyst is chosen from a group consisting of dimethylethanolamine, pentamethyldiethylenetriamine, and bis(2-dimethylaminoethyl)ether.

35. A method of producing a rigid thermosetting foam, the method comprising the steps of:
   (1) preparing a first of two foam forming blends using polymeric polymethylene polyphenylisocyanate;
   (2) preparing a second of two foam forming blends by mixing together:
      (a) a polyol;
      (b) water in an amount less than 1% by weight of the total foam;
      (c) a tertiary amine catalyst having at least one ethyl ($-CH_2-CH_2-$) linkage between two heteroatoms, the heteroatoms being chosen from the group consisting of Nitrogen and Oxygen;
      (d) an alkali metal organo-salt catalyst;
   (3) mixing a first blowing agent with one of the two foam forming blends;
   (4) mixing a frothing agent with one of the two foam forming blends;
   (5) mixing together the first and second foam forming blends whereby the following occurs:
      (a) the tertiary amine catalyst initiates a reaction between the water and the polymeric polymethylene polyphenylisocyanate prior to initiating a polymerizing reaction between the polyol and the polymeric polymethylene polyphenylisocyanate; and,
      (b) the reaction between water and the polymeric polymethylene polyphenylisocyanate produces a second blowing agent which causes a degree of completion of expansion of the mixed blends at any point in time to exceed a degree of completion of the chemical reactions such that expansion is substantially completed prior to the effective conversion of the mixed liquid blends to a rigid solid, the alkali metal organo-salt catalyst being present in an amount sufficient to cause a sufficiently complete trimerization reaction.

36. The method of claim 35, wherein the tertiary amine catalyst is chosen from a group consisting of dimethylethanolamine, pentamethyldiethylenetriamine, and bis(2-dimethylaminoethyl)ether.

37. The method of claim 35, wherein the organo-salt catalyst is chosen from a group consisting of potassium 2-ethylhexanoate and potassium acetate.

38. The method of claim 35, further comprising a preblending of water, potassium hydroxide, and 2-ethyl hexanoic acid.

39. The method of claim 35, wherein the amount of organo-salt catalyst mixed in the blend is greater than about 0.9 weight percent of the total weight of the foam.

40. The method of claim 35, wherein the first blowing agent selected from a group consisting of $CCl_2FCH_3$, and $CF_3CHCl_2$.

41. The method of claim 35, wherein the frothing agent selected from a group consisting of $CHClF_2$, $CH_3CClF_2$, $CHClFCF_3$, $CF_3CH_2F$, and $CH_3CHF_2$.

42. The method of claim 35, wherein the polyol is a polyester polyol having a hydroxyl number between about 150 and 300.

43. The method of claim 35, wherein the polyol is a polyester polyol has an average functionality between about 1.9 and 3.0.

44. The method of claim 35, wherein the polyol is a polyester polyol having a viscosity over about 150,000 cps at 25° C.

45. The method of claim 1, wherein the tertiary amine catalyst is chosen from a group consisting of dimethylethanolamine, pentamethyldiethylenetriamine, and bis(2-dimethylaminoethyl)ether.

46. The polyurethane polyisocyanurate foam produced by the method of claim 25.

47. The polyurethane polyisocyanurate foam produced by the method of claim 35.

* * * * *